(12) United States Patent
Kuras et al.

(10) Patent No.: US 7,378,808 B2
(45) Date of Patent: May 27, 2008

(54) ELECTRIC DRIVE SYSTEM HAVING DC BUS VOLTAGE CONTROL

(75) Inventors: Brian D. Kuras, Metamora, IL (US); Thomas M. Sopko, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 268 days.

(21) Appl. No.: 10/852,137

(22) Filed: May 25, 2004

(65) Prior Publication Data
US 2005/0263329 A1 Dec. 1, 2005

(51) Int. Cl.
*H02P 1/00* (2006.01)
*H02P 7/00* (2006.01)

(52) U.S. Cl. .............. 318/138; 318/140; 318/150; 318/151; 322/40; 307/10.1

(58) Field of Classification Search ............... 318/138, 318/139, 370–379
See application file for complete search history.

(56) References Cited

U.S. PATENT DOCUMENTS

| | | | | |
|---|---|---|---|---|
| 4,495,449 A | * | 1/1985 | Black et al. ................ 318/60 |
| 5,053,632 A | * | 10/1991 | Suzuki et al. ............... 290/45 |
| 5,105,776 A | * | 4/1992 | Tsuchiya et al. .......... 123/192.1 |
| 5,127,085 A | * | 6/1992 | Becker et al. ............... 318/434 |
| 5,172,006 A | * | 12/1992 | Suzuki et al. ............... 290/45 |
| 5,177,677 A | * | 1/1993 | Nakata et al. ............... 363/89 |
| 5,368,116 A | * | 11/1994 | Iijima et al. ............... 180/65.4 |
| 5,396,214 A | * | 3/1995 | Kumar ..................... 338/279 |
| 5,480,220 A | * | 1/1996 | Kumar ..................... 303/151 |
| 5,513,718 A | * | 5/1996 | Suzuki et al. ............. 180/65.2 |
| 5,552,681 A | * | 9/1996 | Suzuki et al. ............. 318/139 |
| 5,629,596 A | * | 5/1997 | Iijima et al. ............... 318/762 |
| 5,646,510 A | * | 7/1997 | Kumar ..................... 322/16 |
| 5,661,378 A | * | 8/1997 | Hapeman .................. 318/52 |
| 5,747,959 A | * | 5/1998 | Iijima et al. ............... 318/762 |
| 5,751,069 A | * | 5/1998 | Rajashekara et al. ..... 290/40 C |
| 5,992,950 A | * | 11/1999 | Kumar et al. ............. 303/151 |
| 5,998,880 A | * | 12/1999 | Kumar ..................... 290/40 B |
| 6,066,936 A | * | 5/2000 | Okamura et al. .......... 320/104 |
| 6,149,544 A | * | 11/2000 | Masberg et al. ............ 477/13 |
| 6,199,650 B1 | * | 3/2001 | Masberg et al. ............ 180/197 |
| 6,333,620 B1 | | 12/2001 | Schmitz et al. |
| 6,384,567 B1 | * | 5/2002 | Maeda ..................... 318/801 |
| 6,420,793 B1 | * | 7/2002 | Gale et al. ................ 290/34 |
| 6,484,830 B1 | | 11/2002 | Gruenwald et al. |
| 6,635,973 B1 | * | 10/2003 | Kagoshima et al. ........ 307/10.1 |
| 6,639,328 B2 | * | 10/2003 | Wacknov .................. 290/52 |
| 6,651,759 B1 | | 11/2003 | Gruenwald et al. |

(Continued)

*Primary Examiner*—Paul Ip
(74) *Attorney, Agent, or Firm*—Finnegan, Henderson, Farabow, Garrett & Dunner

(57) ABSTRACT

An electric drive system has a power source and a generator operatively connected to the power source. The generator is configured to produce a power output. The electric drive system also has at least one capacitor configured to store a supply of power. The electric drive system further has a common bus configured to direct the power output to the capacitor. The electric drive system also has at least one motor configured to receive power from the common bus. The electric drive system additionally has a controller in communication with the at least one motor and the generator. The controller is configured to receive at least one input associated with the motor, to determine a requested motor power as a function of the at least one input, and to operate the generator to produce the requested motor power.

22 Claims, 3 Drawing Sheets

U.S. PATENT DOCUMENTS

| | | | |
|---|---|---|---|
| 6,700,214 B2* | 3/2004 | Ulinski et al. | 290/40 C |
| 6,700,802 B2* | 3/2004 | Ulinski et al. | 363/37 |
| 6,757,598 B2* | 6/2004 | Okoshi | 701/22 |
| 6,771,040 B2* | 8/2004 | Kusumoto et al. | 318/801 |
| 6,861,767 B2* | 3/2005 | Amano et al. | 307/10.1 |
| 6,864,663 B2* | 3/2005 | Komiyama et al. | 320/104 |
| 6,966,803 B2* | 11/2005 | Hara et al. | 440/6 |
| 6,968,260 B2* | 11/2005 | Okada et al. | 701/35 |
| 6,995,480 B2* | 2/2006 | Amano et al. | 307/10.1 |
| 7,028,792 B2* | 4/2006 | Ishikawa et al. | 180/65.1 |
| 7,088,065 B2* | 8/2006 | Ishikawa et al. | 318/376 |
| 7,157,869 B2* | 1/2007 | Ishikawa | 318/139 |
| 7,164,253 B2* | 1/2007 | Sato et al. | 318/801 |
| 2002/0041502 A1* | 4/2002 | Ulinksi et al. | 363/37 |
| 2002/0139593 A1* | 10/2002 | Charaudeau et al. | 180/65.3 |
| 2002/0157881 A1* | 10/2002 | Bakholdin et al. | 180/65.2 |
| 2002/0158513 A1* | 10/2002 | Amano et al. | 307/10.6 |
| 2002/0171383 A1* | 11/2002 | Hisada et al. | 318/432 |
| 2003/0015873 A1* | 1/2003 | Khalizadeh et al. | 290/7 |
| 2003/0030409 A1* | 2/2003 | Kusumoto et al. | 318/801 |
| 2003/0033060 A1* | 2/2003 | Okoshi | 701/22 |
| 2003/0034187 A1* | 2/2003 | Hisada et al. | 180/65.1 |
| 2003/0089556 A1* | 5/2003 | Eilinger | 187/290 |
| 2003/0118876 A1* | 6/2003 | Sugiura et al. | 429/9 |
| 2003/0130772 A1* | 7/2003 | Yanagida et al. | 701/22 |
| 2003/0140880 A1* | 7/2003 | Kahlon et al. | 123/179.3 |
| 2003/0209007 A1* | 11/2003 | Furman et al. | 60/275 |
| 2004/0045751 A1* | 3/2004 | Aoki et al. | 180/65.2 |
| 2004/0122563 A1* | 6/2004 | Okada et al. | 701/1 |
| 2004/0124332 A1* | 7/2004 | Takenaka et al. | 248/648 |
| 2004/0159477 A1* | 8/2004 | Ishikawa et al. | 180/65.1 |
| 2004/0200654 A1* | 10/2004 | Hatsuda et al. | 180/243 |
| 2004/0207348 A1* | 10/2004 | Wilton et al. | 318/139 |
| 2004/0227480 A1* | 11/2004 | Kato et al. | 318/376 |
| 2004/0245947 A1* | 12/2004 | Wilton et al. | 318/139 |
| 2004/0249518 A1* | 12/2004 | Okoshi et al. | 701/1 |
| 2004/0249525 A1* | 12/2004 | Okoshi et al. | 701/22 |
| 2004/0251691 A1* | 12/2004 | King et al. | 290/40 C |
| 2005/0014602 A1* | 1/2005 | Hara et al. | 477/3 |
| 2005/0072608 A1* | 4/2005 | Johnston et al. | 180/65.2 |
| 2005/0093370 A1* | 5/2005 | Amano et al. | 307/10.1 |
| 2005/0104544 A1* | 5/2005 | Ishikawa | 318/139 |
| 2005/0167170 A1* | 8/2005 | Hisada et al. | 180/65.2 |
| 2005/0231171 A1* | 10/2005 | Kato et al. | 320/166 |
| 2005/0269981 A1* | 12/2005 | Sakurai | 318/139 |
| 2005/0279545 A1* | 12/2005 | Matsuda | 180/65.2 |
| 2005/0284676 A1* | 12/2005 | King et al. | 180/65.3 |

* cited by examiner

ELECTRIC DRIVE SYSTEM HAVING DC BUS VOLTAGE CONTROL

TECHNICAL FIELD

The present disclosure relates generally to an electric drive system for a work machine and, more particularly, to an electric drive system having DC bus voltage control.

BACKGROUND

Work machines such as, for example, wheel loaders, track type tractors, and other types of heavy machinery are used for a variety of tasks. These work machines include a power source, which may be, for example, an engine such as a diesel engine, a gasoline engine, or a natural gas engine, that provides the power required to complete these tasks. To efficiently perform these tasks, the power source may be coupled to a generator to produce an electrical power output supplied to one or more electric motors. The motors may be connected to ground engaging devices to propel the work machine.

Typically, the generator is commanded to produce power when a voltage level of an energy storage device disposed between the generator and the motor drops below a predetermined level and to stop producing power when the voltage level of the energy storage device exceeds a predetermined level. For example, U.S. Pat. No. 6,333,620 (the '620 patent) issued to Schmitz et al. on Dec. 25, 2001 describes a series type hybrid vehicle having a power source, a generator, a battery array, at least one electric motor, and a controller. The controller is configured to maintain a state of charge of the battery array within a control limit. The controller compares a state of charge of the battery array to an upper control limit and decreases generator output if the state of charge is equal to or greater than the associated upper control limit. The controller is further configured to increase generator output if the state of charge is less than the upper control limit.

Although the controller of the '620 patent may maintain a sufficiently constant state of charge of the battery array, the controller may require complex and expensive components necessary to respond quickly to power demand fluctuations. In addition, the battery array may provide insufficient acceleration and regenerative braking capacity.

The present disclosure is directed to overcoming one or more of the problems set forth above.

SUMMARY OF THE INVENTION

In one aspect, the present disclosure is directed to an electric drive system that includes a power source and a generator operatively connected to the power source. The generator is configured to produce a power output. The electric drive system also includes at least one capacitor configured to store a supply of power. The electric drive system further includes a common bus configured to direct the power output to the capacitor. The electric drive system also includes at least one motor configured to receive power from the common bus. The electric drive system additionally includes a controller in communication with the at least one motor and the generator. The controller is configured to receive at least one input associated with the motor, to determine a requested motor power as a function of the at least one input, and to operate the generator to produce the requested motor power In another aspect, the present disclosure is directed to a method of operating an electric drive. The method includes operating a power source connected to a generator to produce a power output and storing power within at least one capacitor connected to the generator via a common bus. The method further includes directing power from the common bus to at least one motor. The method also includes receiving at least one input associated with the at least one motor, determining a requested motor power as a function of the at least one input, and operating the generator to produce the requested motor power.

DETAILED DESCRIPTION

Figure 1:
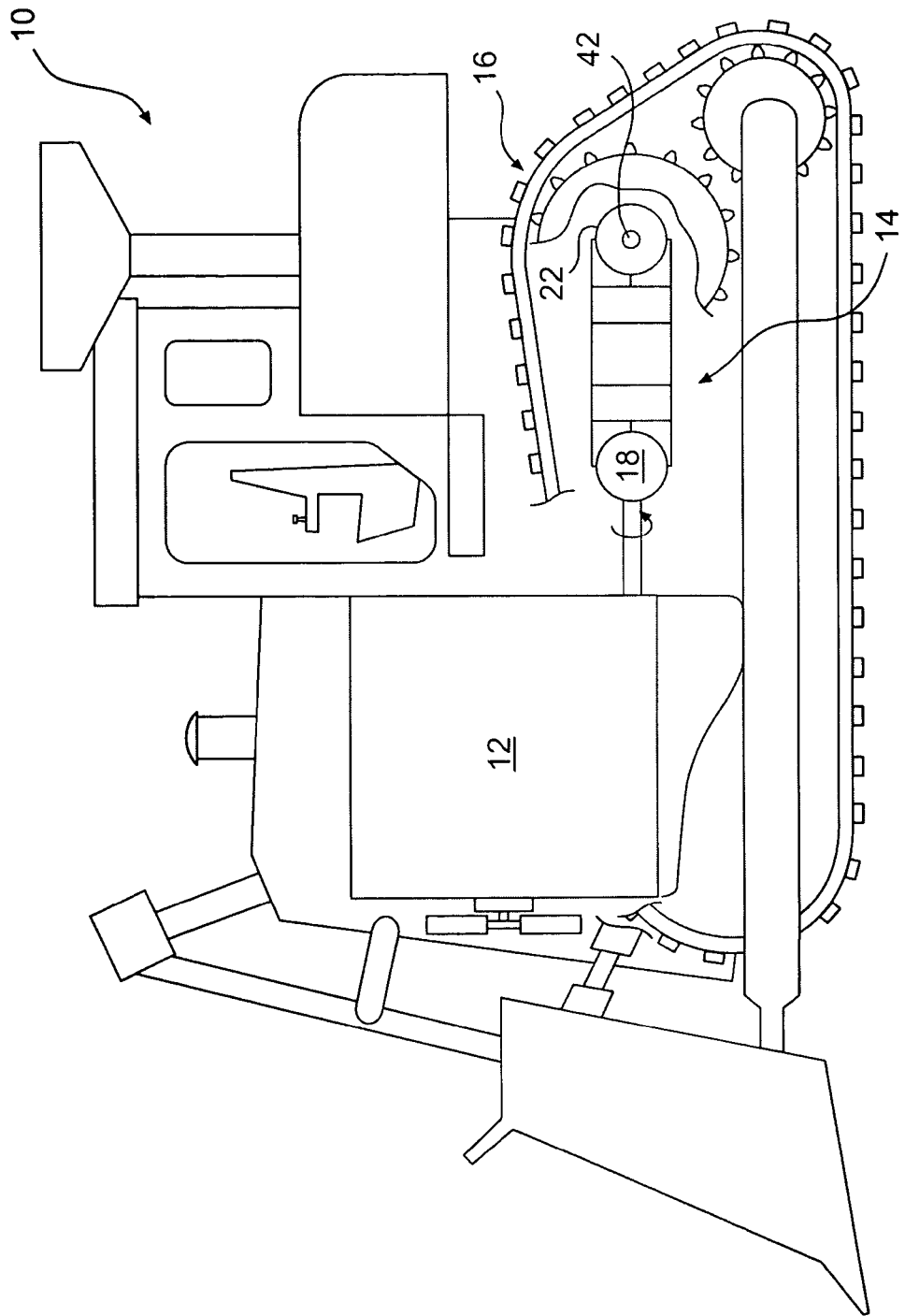
FIG. 1 is a diagrammatic illustration of a work machine according to an exemplary disclosed embodiment.

FIG. 1 illustrates a work machine 10 having a power source 12 and an electric drive 14 connected to a traction device 16. Work machine 10 may be a mobile machine that performs some type of operation associated with an industry such as mining, construction, farming, transportation, or any other industry known in the art. For example, work machine 10 may be an earth moving machine, a marine vessel, an aircraft, an on-highway passenger vehicle, or any other suitable mobile work machine.

Power source 12 may be an engine, such as a diesel engine, a gasoline engine, a natural gas engine, or another appropriate engine. It is contemplated that electric drive 14 may be used with another type of power source such as, for example, a fuel cell. Power source 12 may have a maximum rotational speed limit.

Figure 2:
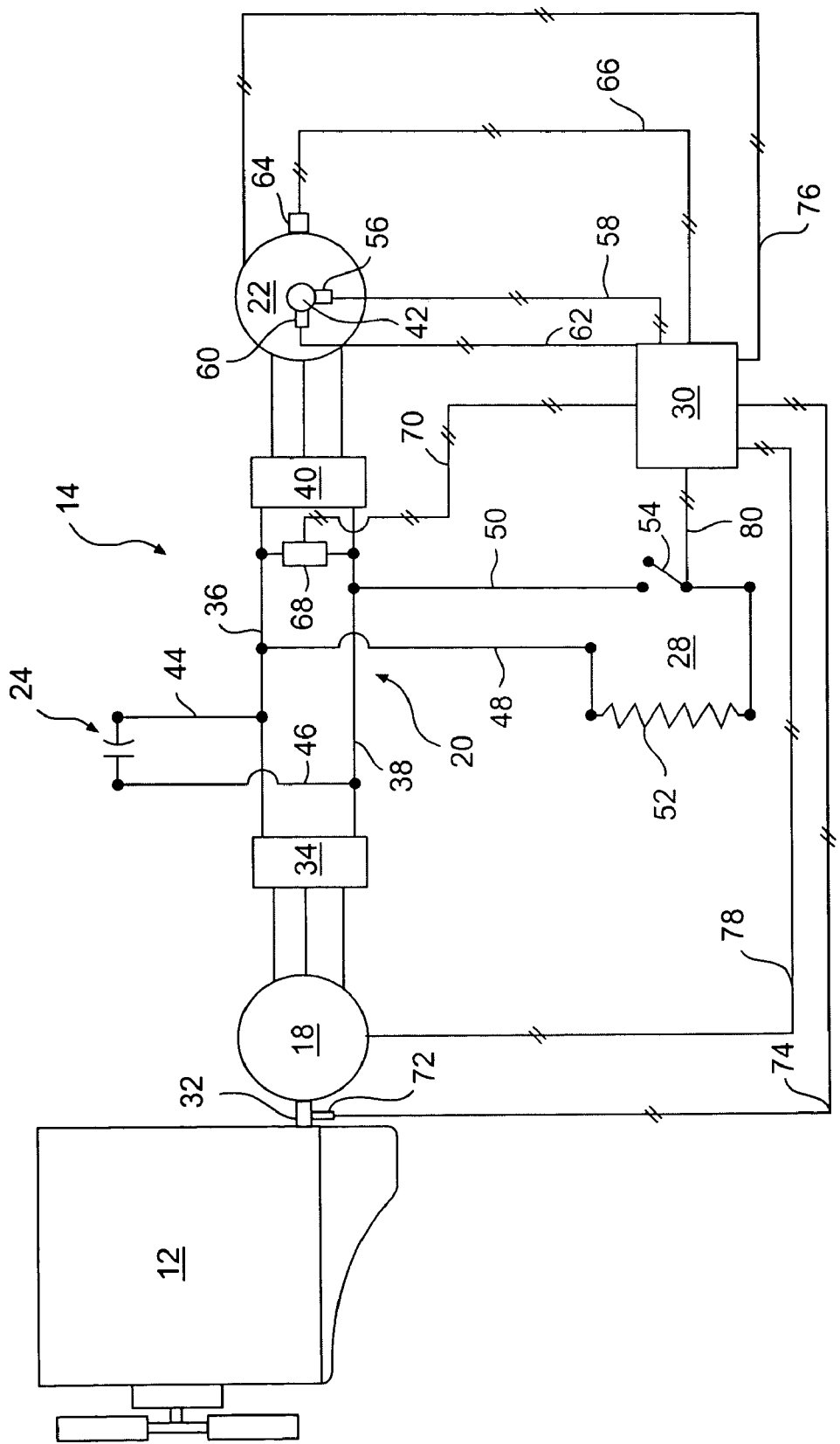
FIG. 2 is a schematic illustration of an electric drive system according to an exemplary disclosed embodiment.

As illustrated in FIG. 2, electric drive 14 may include a generator 18 configured to produce an output power directed to a common bus 20 shared with a motor 22, a capacitor 24, and a resistive grid circuit 28. Electric drive 14 may also include a controller 30 in communication with motor 22, generator 18, resistive grid circuit 28, and common bus 20.

Generator 18 may be a three-phase permanent magnet alternating field-type generator configured to produce a power output in response to a rotational input from power source 12. It is also contemplated that generator 18 may be a switched reluctance generator, a direct phase generator, or any other appropriate type of generator known in the art. Generator 18 may include a rotor (not shown) rotatably connected to power source 12 by any means known in the art such as, for example, by a direct crankshaft connection 32, via a gear train, through a hydraulic circuit, or in any other appropriate manner. Generator 18 may be configured to produce electrical power output as the rotor is rotated within a stator (not shown) by power source 12. Generator 18 may be connected to common bus 20 via a generator inverter 34, which may be configured to invert the three-phase alternating power to direct phase power. It is contemplated that controller 30 may be in communication with generator inverter 34.

Common bus 20 may include positive and negative power lines 36, 38 that electrically connect generator inverter 34, capacitor 24, resistive grid circuit 28, and a motor inverter 40 connected to motor 22. Common bus 20 may also be electrically connected to additional power storage devices (not shown) and accessory power loads (not shown) to provide power to and/or to remove power from common bus 20. It is contemplated that controller 30 may be in communication with motor inverter 40.

Motor 22 may be a permanent magnet alternating field-type motor configured to receive power from common bus 20 and to cause movement of traction device 16. It is also contemplated that motor 22 may be a switched electric motor, a direct phase motor, or any other appropriate type of motor known in the art. Motor 22 may be connected to traction device 16 via a direct shaft coupling 42, via a gear mechanism, or in any other manner known in the art.

Capacitor 24 may be connected to common bus 20 via positive and negative power lines 44, 46 and may have a desired voltage range. It is contemplated that any number of capacitors 24 may be included in electric drive 14 according to the requirements of a particular application. For the purposes of this disclosure, the desired voltage range may be defined as that voltage range recommended by the supplier of capacitor 24 for safe operation and may include an upper limit and a lower limit. It is also contemplated that the desired voltage range may be defined by motor and generator inverter power electronic limitations. The selection of a particular voltage range capacitor 24 implemented within electric drive 14 may be dependent upon the intended application. For example, electric drive 14 intended for operation in a small lightweight passenger vehicle may include capacitor 24 having a desired voltage range of approximately 300-600 volts. Electric drive 14 intended for operation in a larger mining truck application may include capacitor 24 having a desired voltage range of approximately 1500 to 2500 volts.

Capacitor 24 may be configured to draw power from common bus 20 and store this power for later release when motor 22 or other accessory loads draw power from common bus 20. During operation of electric drive 14, generator 18 may be capable of producing power in excess of a requested motor power. If a voltage level of common bus 20 is below an upper voltage limit of a desired voltage range and generator 18 has excess power output, capacitor 24 may be charged until the upper voltage limit is reached. If, however, generator 18 does not have the capacity to supply the power demanded by motor 22 or other accessory loads, capacitor 24 may discharge the power stored within capacitor 24 to common bus 20.

Excess power may also be directed to common bus 20 by motor 22 during regenerative braking. Whenever brakes are applied to work machine 10 to slow work machine 10, energy is removed from work machine 10. The faster work machine 10 is traveling, the more energy it has. The brakes of work machine 10 can capture some of this energy by using regenerative braking. That is, instead of just using the brakes to stop work machine 10, motor 22 may also slow the work machine by acting as a generator while work machine 10 is slowing down. The power generated by motor 22 may be directed to common bus 20 where it may be absorbed by capacitor 24. Power not absorbed by capacitor 24 during regenerative braking may be directed to generator 18. Generator 18 may then be caused to motor power source 12, thereby using operational friction of power source 12 to dissipate the excess power.

Resistive grid circuit 28 may be connected to common bus 20 via positive and negative power lines 48, 50 and configured to dissipate excess power from common bus 20. Resistive grid circuit 28 may have a resistive element 52 and a switch 54. It is contemplated that resistive grid circuit 28 may include a greater number of resistive elements 52 and/or that a greater number of resistive grid circuits 28 may be included in electric drive 14. Switch 54 may be caused to move from an open position to a closed position causing respective open and closed conditions of resistive grid circuit 28. When in the open condition, resistive grid 28 draws no power from common bus 20. When in the closed condition, however, power may be dissipated from common bus 20 by resistive element 52.

Controller 30 may be configured to trigger the closed condition. As described above, excess power (power not absorbed by capacitor 24) regenerated during braking may be dissipated through frictional losses of power source 12 as generator 18 motors power source 12. However, if the excess power is above a predetermined level, power source 12 may exceed the maximum rotational speed limit when attempting to dissipate the excess power. In order to prevent overspeeding of power source 12, resistive grid circuit 28 may be changed to the closed condition to remove power from common bus 20. Controller 30 may trigger the closed condition as power source 12 nears the maximum rotational speed limit.

Controller 30 may be configured to receive inputs indicative of a requested motor power. These inputs may include a motor speed, a motor torque, a motor torque command, a motor voltage and current level, a DC bus voltage level, and/or a generator speed. For example, an actual motor speed may be received via a communication line 58 from a motor speed sensor 56 disposed on shaft coupling 42. An output motor torque may be received via a communication line 62 from a torque sensor 60 disposed on shaft coupling 42. A motor voltage and current level may be received via a communication line 66 from a voltage and current sensor 64 connected to motor 22. It is also contemplated that voltage and current sensor 64 may be embodied in separate sensors configured to sense the separate power characteristics supplied to motor 22. A DC bus voltage level may be received via a communication line 70 from a voltage sensor 68 connected to common bus 20. An actual generator rotational speed may be received via a communication line 74 from a generator speed sensor 72 disposed on crankshaft connection 32.

Controller 30 may also be in communication with motor 22, generator 18, and/or resistive grid circuit 28 via communication lines 76, 78, and 80, respectively. As previously noted, controller 30 may also be in communication with generator inverter 34 and motor inverter 40. Controller 30 may be in communication with motor 22 (or motor inverter 40) to monitor inputs to motor 22 indicative of a command speed or a command torque communicated to motor 22. Controller 30 may be in communication with generator 18 (or generator inverter 34) to send generator torque commands to generator 18. Controller 30 may further be in communication with resistive grid circuit 28 to change resistive grid circuit 28 from the open condition to the closed condition and vice versa.

Controller 30 may be embodied in a single microprocessor or multiple microprocessors. Numerous commercially available microprocessors can be adapted to perform the functions of controller 30. It should be appreciated that controller 30 could readily be embodied in a general work machine microprocessor capable of controlling numerous work machine functions.

Controller 30 may include any means for storing and comparing information and controlling an operating parameter of work machine 10 such as a memory, one or more data storage devices, or any other components that may be used to run an application. Furthermore, although aspects of the present disclosure may be generally described as being stored in memory, one skilled in the art will appreciate that these aspects can be stored on or read from types of computer-related products or computer-readable media such as computer chips and secondary storage devices, including hard disks, floppy disks, optical media, CD-ROM, or other forms of RAM or ROM. Various other known circuits may be associated with controller 30, including power supply circuitry, signal-conditioning circuitry, solenoid driver circuitry, communication circuitry, and other appropriate circuitry.

Controller 30 may configured to change operation of generator 18 in response to the requested generator power. Operational changes of generator 18 may include, for example, entering a positive power producing condition, entering a negative power producing condition (motoring of power source 12), a rate change of positive or negative power production, and/or entering an idle condition.

Controller 30 may include a table of efficiency offset values stored in the memory of controller 30. As will be described in more detail in the following section, these offset values may relate motor characteristics such as, for example, speed and/or temperature to motor efficiency and may be applied to a sum of a requested motor and bus power to determine a requested generator power that will accommodate the requested motor and bus power. These offset values may be determined for each individual motor 22 during a calibration stage of a manufacturing process.

Traction device 16 connected to motor 22 may include any means for propelling work machine 10 such as, for example, belts, tracks, tires, or any other means known in the art. It is contemplated that one or more traction devices 16 on a first side of work machine 10 may be driven independent of one or more traction devices 16 on a second side of work machine 10 (only one side shown), opposite the first.

Figure 3:
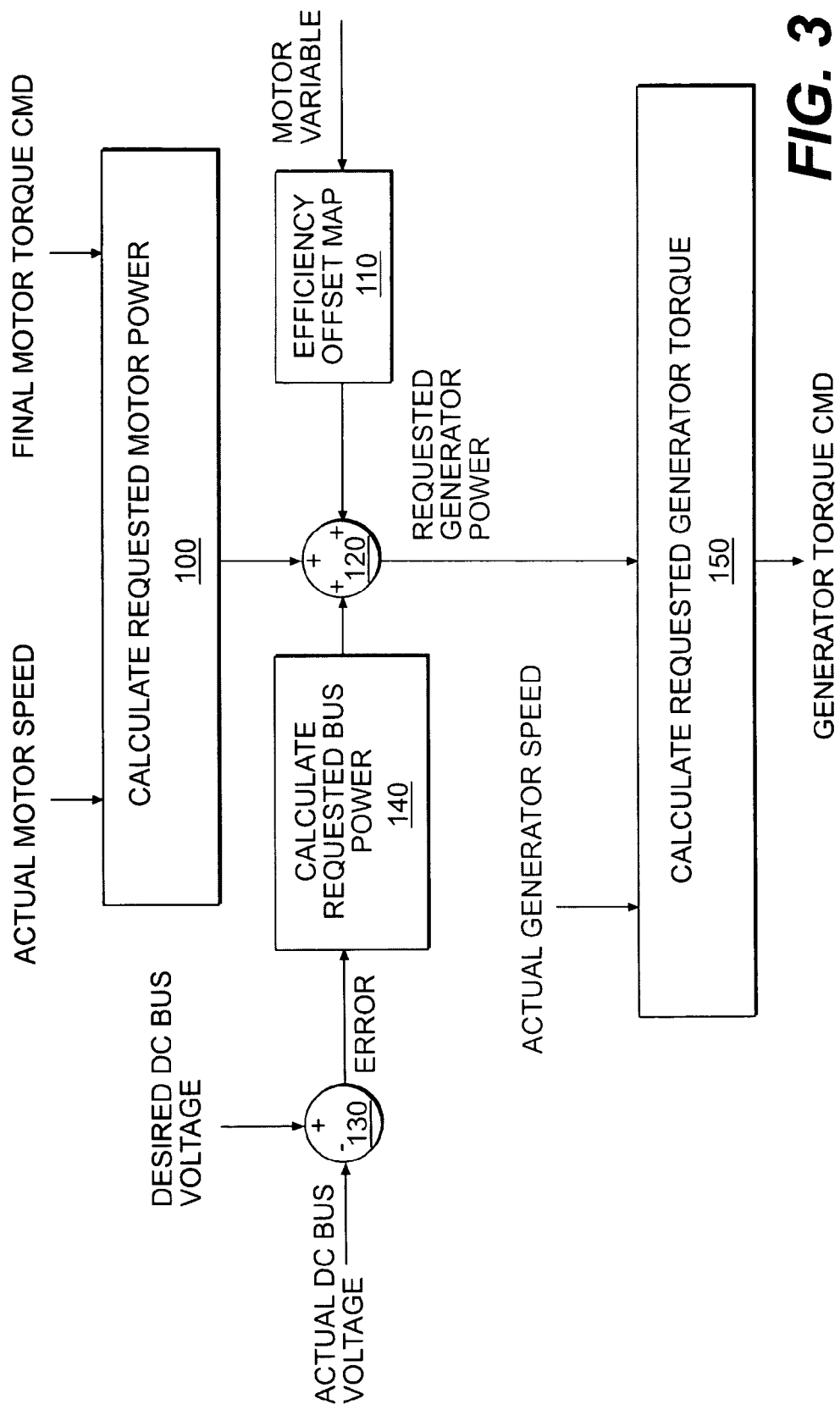
FIG. 3 is process chart showing operation of an electric drive system according to an exemplary disclosed embodiment.

FIG. 3 illustrates an exemplary process chart for electric drive 14 and will be described in more detail in the following section.

INDUSTRIAL APPLICABILITY

The disclosed electric drive may be applicable to any mobile work machine. Based on measured speed, command speed, measured torque, command torque, motor voltage, and/or motor current information, the disclosed electric drive system may operate to minimize overall system cost and to reduce response time associated with a change in motor loading. A change in a motor loading, under normal circumstances, might cause a common bus voltage to drop below or rise above a desired voltage range. The deviation from the desired voltage range may result in power loss, loss of responsiveness, electric drive instability, and possibly damage to power electronics associated with the electric drive system. Rather than waiting for the common bus voltage to drop below a predetermined level during a change in motor loading, sending a requested torque command from the motor directly to the generator simultaneous with the change, may act to smooth power fluctuations, maintain a desired voltage level of common bus 20, improve responsiveness and stability of the electric drive system, and protect the power electronics of the electric drive. Operation of electric drive 14 will now be described in detail with reference to FIG. 3.

The process of determining a generator torque request may be initiated by determining a requested motor power associated with a change in motor loading. Requested motor power is the power required to maintain an operator desired work machine travel speed through various loading conditions. For a given work machine travel speed selected by a machine operator, requested motor power increases as output torque increases. Likewise, for the same given speed, as output torque decreases, requested motor power also decreases.

Requested motor power may be determined as a function of a rotational speed and torque or command torque of motor 22. It is contemplated that requested motor power may also be determined as a function of actual voltage and commanded current, or in many other ways known in the art. Output of motor 22 may be controlled from a closed loop speed command or torque command system (not shown). This closed loop system may function by either issuing a motor output speed command or a motor output torque command to motor 22 that results in the appropriate operator selected work machine travel speed.

Two methods of determining requested motor power as a function of motor speed and torque is described in Eq. 1 and Eq. 2 below:

Requested Motor Power=Actual Motor Speed*Motor Torque Command     Eq. 1

Requested Motor Power=Actual Motor Speed*Actual Motor Torque     Eq. 2

It is also contemplated that neither speed nor torque information may be used to determine requested motor power, but instead, a motor voltage and current may be used according to Eq. 3 and Eq. 4 listed below:

Requested Motor Power=Monitored Motor Voltage*Monitored Motor Current     Eq. 3

Requested Motor Power=Monitored Motor Voltage*Commanded Motor Current     Eq. 4

Voltage levels of common bus 20 may also affect operation of generator 18. As described above, capacitor 24 may have a desired voltage range. If a voltage level of common bus 20, which is connected to capacitor 24, falls below or rises above the desired voltage range, a closed loop algorithm may be implemented to increase or decrease the voltage level across common bus 20 (step 140). In doing so, an actual voltage level measured by voltage sensor 68 may first be compared with the desired voltage of capacitor 24 (step 130). If the voltage level of common bus 20 is outside of the desired voltage range, a requested bus power value calculated as a function of error between actual bus voltage and desired bus voltage may be added to the requested motor power, determined from Eq. 1-4 above (step 120).

Power efficiencies of electric motors may vary as a speed, torque, temperature, and other operating variables of the motor varies. In order to compensate for this effect, an offset factor may be implemented. Motor variables may be compared with an efficiency offset map stored within the memory of controller 30 to determine an offset factor that corresponds with the motor speed (step 110). This offset factor may then be used to offset the sum of requested motor and bus power to determine a requested generator power that accommodates the motor and bus power needs.

Generator 18 may be operated to produce the requested generator power by issuing a torque command to generator 18. The torque commanded from generator 18 may be dependent upon generator speed and the requested generator power determined in step 120 above, and may be determined according to Eq. 5 below (step 150):

Eq. 5

$$\text{Generator Torque Command} = \frac{\text{Requested Generator Power}}{\text{Actual Generator Speed}}$$

It will be apparent to those skilled in the art that various modifications and variations can be made to the disclosed electric drive system. Other embodiments will be apparent to those skilled in the art from consideration of the specification and practice of the disclosed electric drive system. It is intended that the specification and examples be considered as exemplary only, with a true scope being indicated by the following claims and their equivalents.

What is claimed is:

1. An electric drive system, comprising:
   a power source;
   a generator operatively connected to the power source and configured to produce a power output;
   at least one capacitor configured to store a supply of power;
   a common bus configured to direct the power output to the capacitor;
   at least one motor configured to receive power from the common bus;
   a controller in communication with the at least one motor and the generator, the controller configured to receive at least one input associated with the motor, to determine a requested motor power as a function of the at least one input, and to operate the generator to produce the requested motor power; and
   a voltage sensor configured to measure a voltage level of the common bus, wherein the at least one capacitor has a desired voltage range including an upper voltage limit and a lower voltage limit and wherein the controller is configured to operate the generator to increase a power output rate when the voltage level drops below the lower voltage limit and to decrease a power output rate when the voltage level exceeds the upper voltage limit.

2. The electric drive system of claim 1, wherein the at least one input is related to at least one of a motor speed command and a motor torque command.

3. The electric drive system of claim 1, further including a speed sensor associated with the at least one motor and in communication with the controller, wherein the at least one input is a signal generated by the speed sensor indicative of motor speed.

4. The electric drive system of claim 3, wherein the controller includes a memory having stored therein motor efficiency offset values related to the speed of the at least one motor, wherein the requested motor power is further determined as a function of the motor efficiency offset values.

5. The electric drive system of claim 1, further including: a voltage sensor associated with the at least one motor and in communication with the controller; and a current sensor associated with the at least one motor and in communication with the controller, wherein the at least one input is a related to signals generated by the voltage sensor and the current sensor indicative of a motor voltage level and a motor current level.

6. The electric drive system of claim 1, further including a torque sensor associated with the at least one motor and in communication with the controller, wherein the at least one input is a signal generated by the torque sensor indicative of a motor torque.

7. The electric drive system of claim 1, further including a resistive grid circuit configured to dissipate power from the common bus when a reduction in requested motor power is determined.

8. The electric drive system of claim 1, further including a resistive grid circuit configured to dissipate power from the common bus when a reduction in the requested motor power is determined and a speed of the power source exceeds the maximum speed limit.

9. A method of operating an electric drive, comprising:
   operating a power source connected to a generator to produce a power output;
   storing power within at least one capacitor connected to the generator via a common bus;
   directing power from the common bus to at least one motor;
   receiving at least one input associated with the at least one motor;
   determining a requested motor power as a function of the at least one input;
   operating the generator to produce the requested motor power;
   comparing a voltage level of the common bus to a desired voltage range of the at least one capacitor; and
   operating the generator to increase a power output rate when the voltage level of the common bus drops below a lower voltage limit of the desired voltage range and to decrease a power output rate when the voltage level of the common bus exceeds an upper voltage limit of the desired voltage range.

10. The method of claim 9, further including monitoring at least one of a desired motor speed command and a desired motor torque command, wherein the at least one input is related to the at least one of a desired motor speed command and a desired motor torque command.

11. The method of claim 9, further including measuring a speed associated with the at least one motor, wherein the at least one input is related to the measured speed.

12. The method of claim 11, further including comparing the measured speed with a lookup table stored on a memory associated with the electric drive to determine a motor efficiency offset value, wherein the requested motor power is further determined as a function of the motor efficiency offset value.

13. The method of claim 9, further including measuring a voltage and a current associated with the at least one motor, wherein the at least one input is determined as a function of the measured voltage and current.

14. The method of claim 9, further including measuring a torque associated with the at least one motor, wherein the at least one input is related to the measured torque.

15. The method of claim 9, further including comparing a voltage level of the common bus to a desired voltage range of the at least one capacitor; and dissipating power from the common bus with a resistive grid when the voltage level of the common bus exceeds an upper voltage limit of the desired voltage range.

16. The method of claim 9, wherein operating the generator includes causing the generator to motor the power source to dissipate power generated by the at least one motor.

17. The method of claim 9, further including comparing a voltage level of the common bus to a desired voltage range of the at least one capacitor; and dissipating power from the common bus with a resistive grid when the voltage level of the common bus exceeds an upper voltage limit of the desired voltage range and a speed of the power source exceeds a maximum speed limit.

18. A machine, comprising:
a housing;
at least one traction device configured to support the housing;
an electric drive system, including:
  a power source;
  a generator operatively connected to the power source and configured to produce a power output;
  at least one capacitor configured to store a supply of power;
  a common bus configured to direct the power output to the capacitor;
  at least one motor configured to receive power from the common bus and to drive the at least one traction device;
  a controller in communication with the at least one motor and the generator, the controller configured to receive at least one input associated with the motor, to determine a requested motor power as a function of the at least one input, and to operate the generator to produce the requested motor power; and
  a voltage sensor configured to measure a voltage level of the common bus, wherein the at least one capacitor has a desired voltage range including an upper voltage limit and a lower voltage limit and wherein the controller is configured to operate the generator to increase a power output rate when the voltage level drops below the lower voltage limit and to decrease power output rate when the voltage level exceeds the upper voltage limit.

19. The machine of claim 18, wherein the at least one input is related to at least one of a motor speed command and a motor torque command.

20. The machine of claim 18, further including a speed sensor associated with the at least one motor and in communication with the controller, wherein the at least one input is a signal generated by the speed sensor indicative of motor speed.

21. The machine of claim 20, wherein the controller includes a memory having stored therein motor efficiency offset values related to the speed of the at least one motor, wherein the requested motor power is further determined as a function of the motor efficiency offset values.

22. The work machine of claim 18, further including a resistive grid circuit configured to dissipate power from the common bus when a reduction in requested motor power is determined.

* * * * *